United States Patent
Hachiya (10) Patent No.: US 6,812,682 B2
(45) Date of Patent: Nov. 2, 2004

(54) SWITCHING POWER SUPPLY UNIT AND SEMICONDUCTOR DEVICE FOR SWITCHING POWER SUPPLY

(75) Inventor: Yoshiaki Hachiya, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 95 days.

(21) Appl. No.: 10/309,037

(22) Filed: Dec. 4, 2002

(65) Prior Publication Data

US 2003/0107356 A1 Jun. 12, 2003

(30) Foreign Application Priority Data

Dec. 6, 2001 (JP) ...................................... 2001-372135

(51) Int. Cl.[7] .............................................. G05F 1/40
(52) U.S. Cl. ..................................... 323/284; 323/282
(58) Field of Search ................................ 323/265, 266, 323/282–286, 289, 290, 249, 351

(56) References Cited

U.S. PATENT DOCUMENTS

| 5,617,016 A | * 4/1997 | Borghi et al. ............... 323/284 |
| 6,154,015 A | * 11/2000 | Ichiba ......................... 323/225 |
| 6,294,903 B1 | 9/2001 | Yamashita et al. |
| 6,414,471 B1 | * 7/2002 | Balakrishnan et al. ...... 323/283 |

FOREIGN PATENT DOCUMENTS

| JP | 10-191625 A | 7/1998 |
| JP | 3100914 B2 | 8/2000 |
| JP | 2000-308335 | 11/2000 |
| JP | 2001-224166 | 8/2001 |
| JP | 2001-224169 | 8/2001 |
| JP | 2001-238441 | 8/2001 |

* cited by examiner

Primary Examiner—Michael Sherry
Assistant Examiner—Gary L. Laxton
(74) Attorney, Agent, or Firm—McDermott, Will & Emery (57) ABSTRACT

A control circuit for controlling an operation of a switching device includes: an output load detection circuit for receiving a feedback signal from a feedback circuit; an error amplification circuit for producing an error voltage signal based on an output signal from the output load detection circuit and a reference voltage; a drain current detection circuit for detecting a drain current; and a light load detection circuit for stopping a switching operation when the error voltage signal is lower than a lower limit voltage value while resuming the switching operation when the error voltage signal is higher than an upper limit voltage value. The reference voltage output from a reference voltage source of the light load detection circuit is selected from the lower limit voltage value and the upper limit voltage value based on the value of an output voltage from a comparator.

13 Claims, 7 Drawing Sheets

SWITCHING POWER SUPPLY UNIT AND SEMICONDUCTOR DEVICE FOR SWITCHING POWER SUPPLY

BACKGROUND OF THE INVENTION

The present invention relates to a step-down chopper-type switching power supply unit of a non-insulated type, in which the input side and the output side are not electrically insulated from each other. More particularly, the present invention relates to a switching power supply unit with which the power consumption can be reduced in a light-load operation and in a stand-by operation, and also to a semiconductor device for such a switching power supply.

Figure 6:
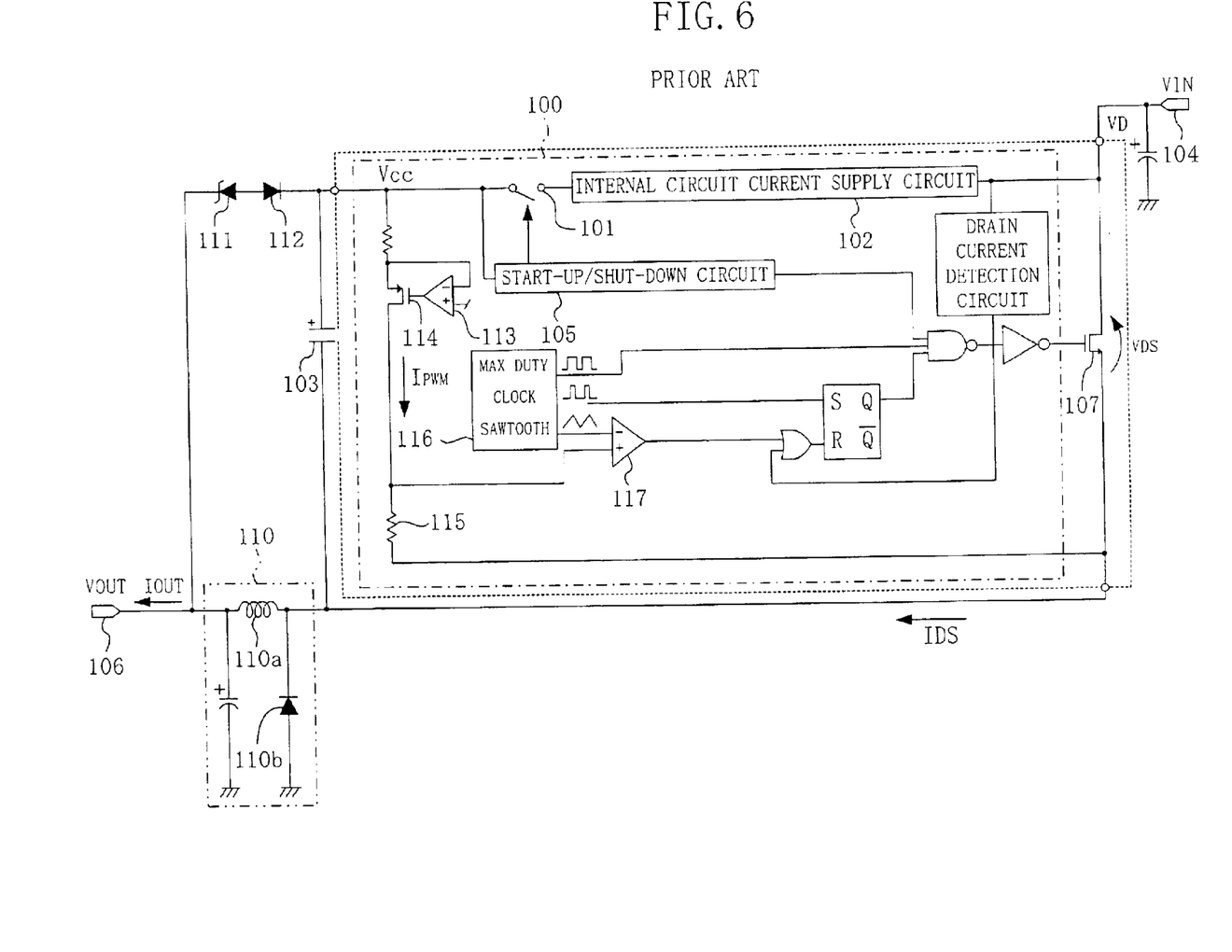
FIG. 6 is a schematic circuit diagram illustrating a conventional step-down chopper-type switching power supply unit.
Figure 7:
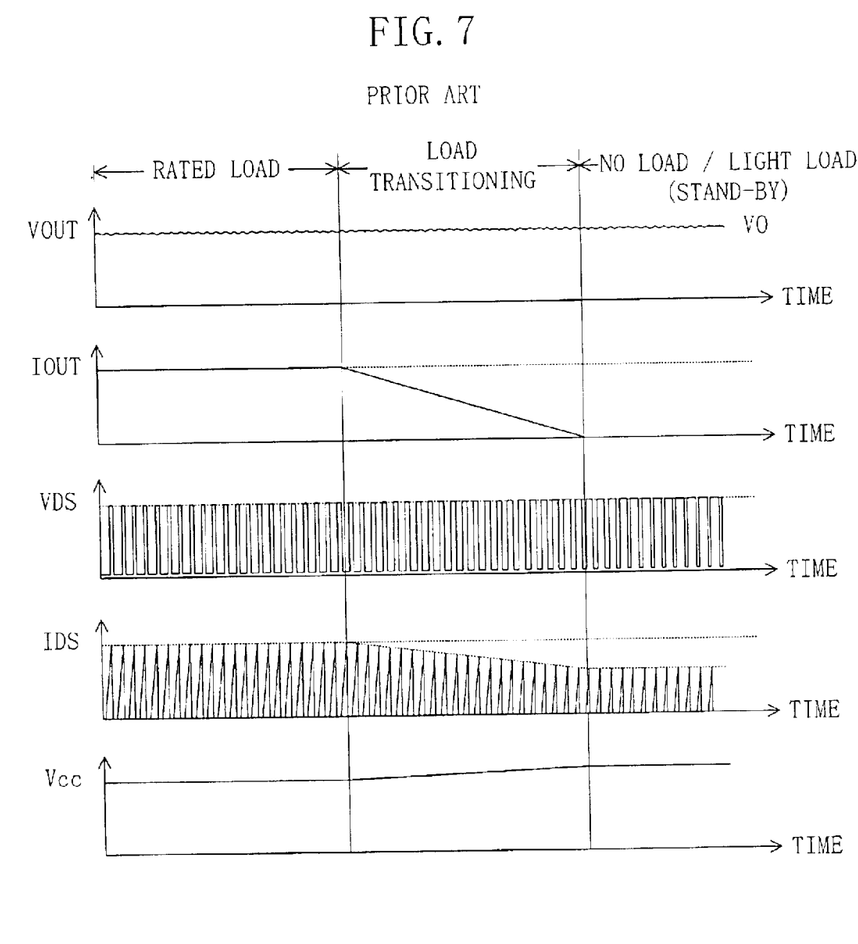
FIG. 7 is a current/voltage waveform diagram illustrating the operation of the conventional step-down chopper-type switching power supply unit.

A conventional switching power supply unit will be described with reference to the drawings. FIG. 6 illustrates a schematic circuit configuration of a non-insulated step-down switching power supply unit, and FIG. 7 illustrates current/voltage waveforms during the operation of the switching power supply unit.

The general configuration and the operation of the switching power supply unit illustrated in FIG. 6 will now be described.

First, before the start-up of a control circuit 100, a switch 101 in the control circuit 100 is in a closed state, whereby an internal circuit current supply circuit 102 and a control circuit power supply capacitor 103 are connected to each other.

When an input voltage VIN is applied to a main input terminal 104, a control current flows from the internal circuit current supply circuit 102 via the switch 101 to the control circuit power supply capacitor 103, thereby increasing a power supply voltage Vcc of the control circuit 100. When the power supply voltage Vcc reaches the start-up voltage of the control circuit 100, a start-up/shut-down circuit 105 starts operating and the control circuit 100 starts up.

When the start-up/shut-down circuit 105 starts operating, the switch 101 is opened, thereby stopping the current supply from the internal circuit current supply circuit 102 to the control circuit power supply capacitor 103. Thereafter, a control current is supplied to the control circuit 100 from the control circuit power supply capacitor 103. At this point, an output voltage VOUT at a main output terminal 106 is 0 V.

Then, the control circuit 100 starts operating, thereby starting the switching (i.e., ON/OFF) operation of a switching device 107, which is an N-channel MOSFET. When the switching device 107 is ON, a drain current IDS flows from the main input terminal 104 via the switching device 107 into a coil 110$a$ of a voltage conversion circuit 110. Then, when the switching device 107 is turned OFF, the electric energy accumulated in the coil 110$a$ is supplied to the main output terminal 106 via a regenerative diode 110$b$, thereby increasing the output voltage VOUT at the main output terminal 106.

When the switching device 107 is turned OFF, with the output voltage VOUT having increased to be greater than the sum of a breakdown voltage Vz of a Zener diode 111, which is an output voltage detection circuit, a forward voltage Vf of a diode 112, which is a feedback circuit, and a power supply voltage Vcc of the control circuit 100, i.e., Vz+Vf+Vcc, a current flows into the control circuit power supply capacitor 103 from the main output terminal 106 via the Zener diode 111 and the diode 112. As a result, the voltage value of the output voltage VOUT is fed back to the control circuit 100, and the power supply voltage Vcc is supplied from the main output terminal 106 to the control circuit 100.

When the power supply voltage Vcc is increased by the voltage supplied from the main output terminal 106 to the control circuit 100, and the power supply voltage Vcc reaches a predetermined value, a switching element 114 is turned ON by a shunt regulator 113, and a PWM control current $I_{PWM}$ is supplied from the control circuit power supply capacitor 103 to a resistor 115, whereby a voltage is applied across the resistor 115.

The on-duty ratio of the switching device 107 is determined by the voltage across the resistor 115 and the output signal of a comparator 117, which receives a triangular-wave signal from an oscillator 116, whereby the pulse width to be applied to the switching device 107 is determined.

As described above, the conventional switching power supply unit variably controls the duty ratio of the switching device 107, thereby controlling the output voltage VOUT at the main output terminal 106 to be a predetermined value.

As described above, the conventional switching power supply unit employs a pulse width modulation (PWM) method for improving the precision of the output voltage VOUT. Typically, a switching frequency fc in the PWM method is set to a constant value of about 100 kHz to 200 kHz, for example. Moreover, the comparator 117 determines the on-duty ratio δ of the switching device 107 as described above, and operates with a constant frequency and with the minimum on-duty ratio during a light-load operation, including a stand-by operation, as illustrated in FIG. 7.

In recent years, there is a demand for reducing the amount of energy use, i.e., energy conservation, from an environmental point of view. Thus, there is a demand for further reduction in the power consumption and further improvement in the efficiency for power supply units, particularly for switching power supply units.

However, in the conventional switching power supply unit, the switching device 107 is in the switching operation regardless of the magnitude of the load. Therefore, power is constantly wasted while being supplied to, and consumed by, the main output terminal 106. Moreover, there is an increased switching loss because the switching frequency fc is relatively high, i.e., 100 kHz or more.

SUMMARY OF THE INVENTION

The present invention has been made in order to solve these problems in the prior art, and has an object to reduce the power consumption and increase the efficiency of a switching power supply unit or a semiconductor device for a switching power supply.

In order to achieve the object set forth above, the present invention provides a switching power supply unit or a semiconductor device for a switching power supply, in which the application of a switching signal to a switching element is stopped depending on a power supply voltage of a control circuit that is detected by an output voltage detection circuit and fed back to the control circuit.

Specifically, a switching power supply unit of the present invention includes: a smoothing input capacitor for receiving a first DC voltage; a switching element for receiving the first DC voltage; a control circuit for controlling an operation of the switching element; a control circuit power supply capacitor provided between an output terminal of the switching element and a reference voltage terminal of the control circuit; a voltage conversion circuit for receiving an output signal from the switching element and converting the first DC voltage into a second DC voltage whose absolute voltage value is smaller than that of the first DC voltage; an output voltage detection circuit provided on an output side; and a feedback circuit for receiving a detection signal from the output voltage detection circuit and feeding back the received detection signal to the control circuit, the control circuit including: a regulator provided between an input terminal of the switching element and the reference voltage terminal for holding a voltage at the reference voltage terminal at a predetermined value; an output load detection circuit for receiving a feedback signal from the feedback circuit; an error amplifier for producing an error voltage signal that represents a difference between an output signal from the output load detection circuit and a reference voltage; an element current detection circuit for detecting a current flowing through the switching element with an output signal of the error amplifier being a reference; and a light load detection circuit for stopping a switching operation of the switching element when the error voltage signal is lower than a lower limit voltage while resuming the switching operation of the switching element when the error voltage signal is higher than an upper limit voltage, wherein: the light load detection circuit includes a reference voltage source for outputting the lower limit voltage and the upper limit voltage, and a comparator for comparing a voltage signal output from the reference voltage source with the error voltage signal; and the lower limit voltage and the upper limit voltage are switched from one to another based on an output signal of the comparator.

With the switching power supply unit of the present invention, the light load detection circuit receiving the error voltage signal stops the switching operation of the switching element when the received error voltage signal is lower than the lower limit voltage while resuming the switching operation of the switching element when the error voltage signal is higher than the upper limit voltage. When the switching power supply unit is in a light-load operation, the load current decreases and the second DC voltage, which is the output voltage, increases, whereby the feedback signal current increases. This increases the voltage value of the output signal from the output load detection circuit. Therefore, in the error amplifier of the present invention, the difference between the output signal from the output load detection circuit and the reference voltage decreases, and thus the error voltage signal decreases to be lower than the lower limit voltage, thereby stopping the switching operation of the switching element. This reduces the switching loss at the switching element, whereby it is possible to reduce the power consumption during a light-load operation and to improve the power efficiency. Thus, it is possible to significantly reduce the power consumption.

In the switching power supply unit of the present invention, it is preferred that the feedback circuit includes a photo coupler.

In the switching power supply unit of the present invention, it is preferred that the error voltage signal changes linearly according to a current flowing through the feedback circuit, so that a period of time for which the switching operation of the switching element is stopped changes linearly with respect to a change in a power at a main output terminal.

In the switching power supply unit of the present invention, it is preferred that the output voltage detection circuit includes a circuit including a Zener diode and a light emitting element connected in series with each other.

In the switching power supply unit of the present invention, it is preferred that the feedback circuit includes a switching element having a light receiving section.

In the switching power supply unit of the present invention, it is preferred that the output voltage detection circuit and the feedback circuit are a Zener diode and a photo coupler, respectively.

In the switching power supply unit of the present invention, it is preferred that a value of the first DC voltage is about 100 V or more, and a value of the second DC voltage is about 25 V or less.

In the switching power supply unit of the present invention, it is preferred that the control circuit includes overcurrent protection means for detecting an overcurrent to stop the switching operation of the switching element.

In the switching power supply unit of the present invention, it is preferred that the control circuit includes overcurrent protection means for detecting an overcurrent to stop the switching operation of the switching element, and overheat protection means for detecting an overheated state to stop the switching operation of the switching element.

A semiconductor device of the present invention is a semiconductor device for a switching power supply, the switching power supply including: a smoothing input capacitor for receiving a first DC voltage; a switching element for receiving the first DC voltage; a control circuit for controlling an operation of the switching element; a control circuit power supply capacitor provided between an output terminal of the switching element and a reference voltage terminal of the control circuit; a voltage conversion circuit for receiving an output signal from the switching element and converting the first DC voltage into a second DC voltage whose absolute voltage value is smaller than that of the first DC voltage; an output voltage detection circuit provided on an output side; and a feedback circuit for receiving a detection signal from the output voltage detection circuit and feeding back the received detection signal to the control circuit, the semiconductor device including the switching element and the control circuit, the control circuit including: a regulator provided between an input terminal of the switching element and the reference voltage terminal for holding a voltage at the reference voltage terminal at a predetermined value; an output load detection circuit for receiving a feedback signal from the feedback circuit; an error amplifier for producing an error voltage signal that represents a difference between an output signal from the output load detection circuit and a reference voltage; an element current detection circuit for detecting a current flowing through the switching element with an output signal of the error amplifier being a reference; and a light load detection circuit for stopping a switching operation of the switching element when the error voltage signal is lower than a lower limit voltage while resuming the switching operation of the switching element when the error voltage signal is higher than an upper limit voltage, wherein: the light load detection circuit includes a reference voltage source for outputting the lower limit voltage and the upper limit voltage, and a comparator for comparing a voltage signal output from the reference voltage source with the error voltage signal; and the lower limit voltage and the upper limit voltage are switched from one to another based on an output signal of the comparator.

The semiconductor device for a switching power supply of the present invention has a configuration as that of the switching power supply unit of the present invention, whereby effects as those of the switching power supply unit can be obtained. In addition, since the switching element and the control circuit are made into a semiconductor device, it is easy to reduce the size and the power consumption.

It is preferred that the semiconductor device for a switching power supply of the present invention further includes detection voltage variable means capable of variably setting a value of the lower limit voltage or the upper limit voltage.

In the semiconductor device for a switching power supply of the present invention, it is preferred that the switching element and the control circuit are integrated on a single semiconductor substrate so that the input terminal and the output terminal of the switching element, and the reference voltage terminal and a feedback signal input terminal of the control circuit serve as external connection terminals.

In the semiconductor device for a switching power supply of the present invention, it is preferred that the switching element and the control circuit are contained in a single package so that the input terminal and the output terminal of the switching element, and the reference voltage terminal and a feedback signal input terminal of the control circuit serve as external connection terminals.

DETAILED DESCRIPTION OF THE INVENTION

An embodiment of the present invention will now be described with reference to the drawings.

Figure 1:
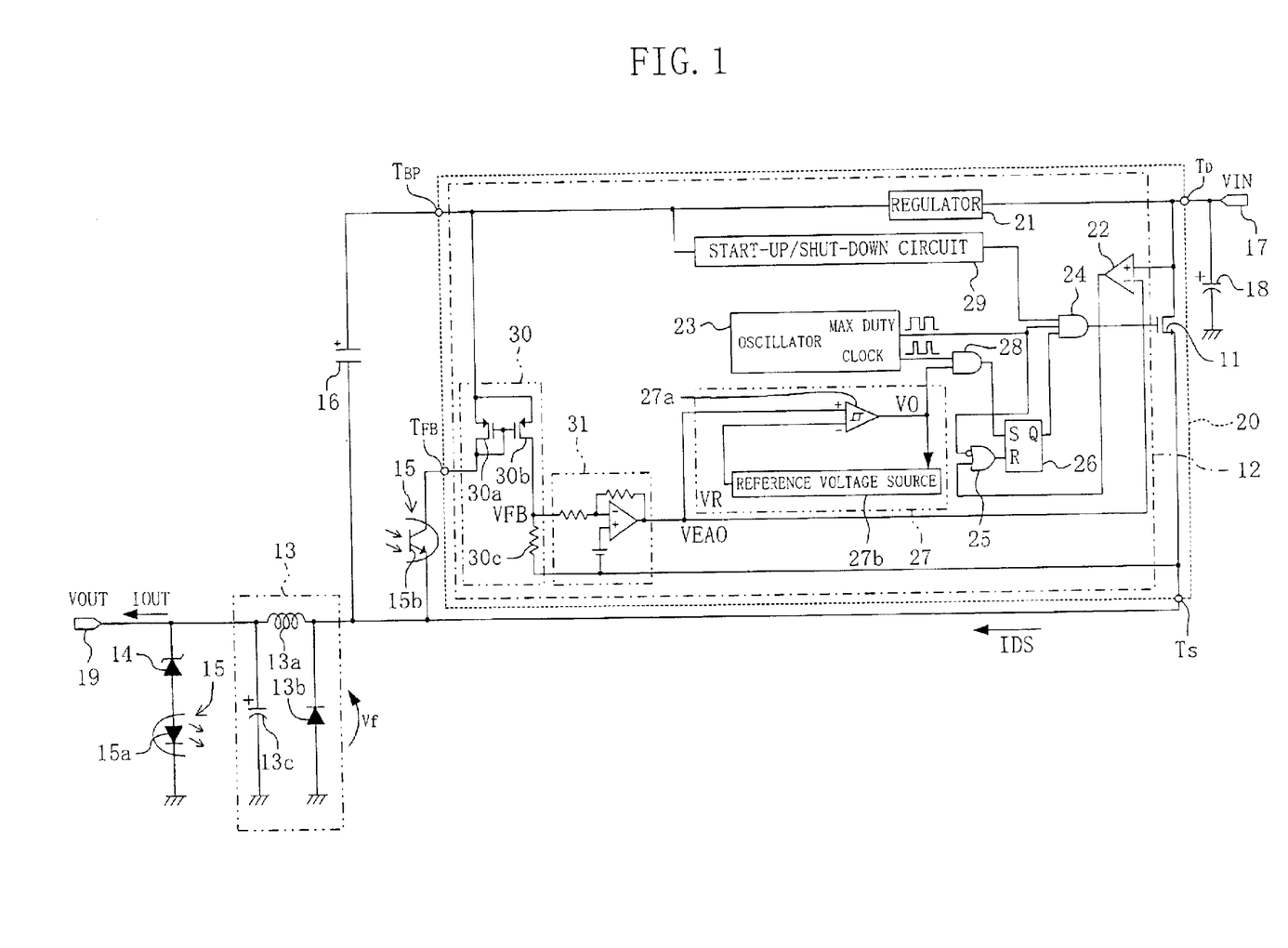
FIG. 1 is a schematic circuit diagram illustrating a step-down chopper-type switching power supply unit according to an embodiment of the present invention.
Figure 2:
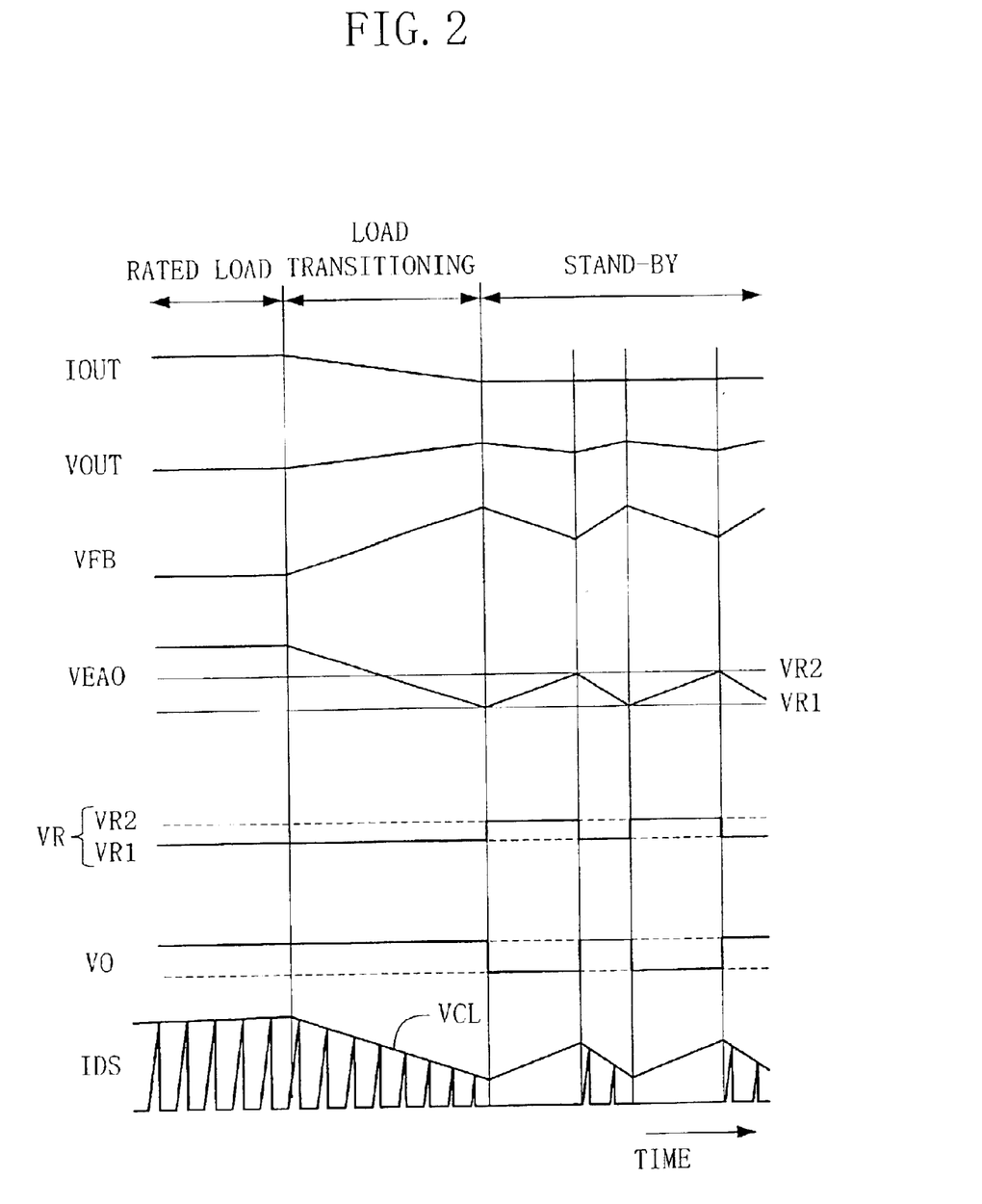
FIG. 2 is a current/voltage waveform diagram illustrating the operation of the step-down chopper-type switching power supply unit according to the embodiment of the present invention.

FIG. 1 illustrates a schematic circuit configuration of a non-insulated step-down chopper-type switching power supply unit according to the embodiment of the present invention. FIG. 2 illustrates current/voltage waveforms when the output load transitions from the rated load to a light load.

As illustrated in FIG. 1, the switching power supply unit of the present embodiment includes a switching device 11, e.g., an N-channel power MOSFET, a control circuit 12 for controlling the switching operation of the switching device 11, a voltage conversion circuit 13 for converting the input voltage VIN into the output voltage VOUT, an output voltage detection circuit 14 for detecting a predetermined output voltage value V0, a feedback circuit 15 for sending a feedback signal to the control circuit 12 when the predetermined output voltage value V0 is exceeded, and a control circuit power supply capacitor 16 for producing a power supply voltage for the control circuit 12. Alternatively, the feedback circuit 15 may be included in the output voltage detection circuit 14.

The switching device 11 includes a drain terminal $T_D$, being the input terminal, which is connected to a main input terminal 17, a gate, being the control terminal, which receives the output signal from the control circuit 12, a source terminal $T_S$, being the output terminal, which is connected to the voltage conversion circuit 13. Moreover, a positive terminal of a smoothing input capacitor 18 is connected between the main input terminal 17 and the drain terminal $T_D$.

The control circuit 12 is connected to the drain terminal $T_D$ and the source terminal $T_S$. Moreover, the control circuit 12 includes a reference voltage terminal $T_{BP}$ to which the positive terminal of the control circuit power supply capacitor 16 is connected, and a feedback signal input terminal $T_{FB}$ connected to the feedback circuit 15.

The voltage conversion circuit 13 includes a coil 13a connected in series between the source terminal $T_S$ and a main output terminal 19, a regenerative diode 13b whose cathode is connected between the coil 13a and the source terminal $T_S$ and whose anode is grounded, and an output capacitor 13c whose positive terminal is connected between the coil 13a and the main output terminal 19 and whose negative terminal is grounded.

The output voltage detection circuit 14 is a Zener diode whose cathode is connected to the main output terminal 19 and whose anode is connected to the feedback circuit 15.

The feedback circuit 15 is a photo coupler whose light emitting section 15a is a light emitting diode whose anode is connected to the output voltage detection circuit 14 and whose cathode is grounded. Moreover, a light receiving section 15b of the feedback circuit 15 is a photo transistor whose collector is connected to the feedback signal input terminal $T_{FB}$ of the control circuit 12 and whose emitter is connected to the source terminal $T_S$.

The circuit configuration of the control circuit 12 will now be described in detail.

The control circuit 12 includes a voltage regulator 21, which is connected between the drain terminal $T_D$ and the reference voltage terminal $T_{BP}$ and holds the voltage value of the reference voltage terminal $T_{BP}$ at a predetermined value by supplying a current from the drain terminal $T_D$ to the reference voltage terminal $T_{BP}$. Herein, the voltage, which is applied to the reference voltage terminal $T_{BP}$, is used as the driving voltage for an output load detection circuit 30, with the source terminal $T_S$ being the ground (reference).

Moreover, the control circuit 12 includes a drain current detection circuit 22 whose positive phase input terminal is connected to the drain terminal $T_D$, and the drain current detection circuit 22 detects the on-state voltage of the switching device 11. Thus, the control circuit 12 has an overcurrent protection function with the on-state resistance of the switching device 11 being used as a resistance for detecting an overcurrent level. Therefore, a current of an overcurrent detection level always flows between the drain terminal $T_D$ and the source terminal $T_S$ of the switching device 11 during a period in which the switching device 11 is ON. Moreover, the on-duty ratio δ of the switching device 11 is determined by the inductance value of the coil 13a in the voltage conversion circuit 13.

Furthermore, the control circuit 12 includes an oscillator 23 for outputting a maximum duty (MAX DUTY) signal, which determines the maximum on-duty ratio of the switching device 11, and a clock (CLOCK) signal having the switching frequency fc. Therefore, the period of time during which the switching device 11 is ON is held at a constant value by the control circuit 12. Note that the period of time during which the switching device 11 is ON as used herein is a setting value that is set in the control circuit 12, and the setting value is longer than the period of time that is determined by the inductance value of the coil 13a in the voltage conversion circuit 13.

The maximum duty signal output from the oscillator 23 is input to one terminal of a first AND circuit 24 and to one terminal of an OR circuit 25 via an inverter. The output signal of the first AND circuit 24 is output to the gate of the switching device 11, and the output signal of the OR circuit 25 is output to a reset terminal R of an RS flip flop circuit 26. Moreover, the output signal from the drain current detection circuit 22 is input to the other terminal of the OR circuit 25.

The clock signal output from the oscillator 23 and the output signal from a light load detection circuit 27 are input to a second AND circuit 28, and the output signal of the second AND circuit 28 is input to a set terminal S of the RS flip flop circuit 26. The output signal of the RS flip flop circuit 26 is output to the first AND circuit 24 through a non-inverted output terminal Q.

The first AND circuit 24 is connected to a start-up/shut-down circuit 29, which detects the voltage at the reference voltage terminal $T_{BP}$ to output a low level signal if the detected voltage value has not reached a predetermined value and output a high level signal if the detected voltage value has reached the predetermined value. Therefore, the first AND circuit 24 outputs, to the switching device 11, the logical product of the maximum duty signal from the oscillator 23, the output signal from the RS flip flop circuit 26 and the output signal from the start-up/shut-down circuit 29.

The output load detection circuit 30 is a current mirror circuit including a first P-channel FET 30a and a second P-channel FET 30b having a shared source and a shared gate. The source of the first P-channel FET 30a is connected to the shared gate and is also connected to the feedback signal input terminal $T_{FB}$. The source of the second P-channel FET 30b serves as an output terminal to an error amplification circuit 31 and is connected to one end of a resistor 30c, with the other end of the resistor 30c being connected to the source terminal $T_S$.

The error amplification circuit 31 outputs an error voltage signal VEAO, which represents the difference between the reference voltage in the error amplification circuit 31 and the output signal from the output load detection circuit 30, i.e., a feedback voltage signal VFB. The error voltage signal VEAO is output to the light load detection circuit 27 and to the negative phase input terminal of the drain current detection circuit 22.

The light load detection circuit 27 includes a comparator 27a for receiving the error voltage signal VEAO through the positive phase input terminal, and a reference voltage source 27b for outputting a reference voltage VR to the negative phase input terminal of the comparator 27a. Herein, the reference voltage VR output from the reference voltage source 27b is selected from a lower limit voltage value VR1 and an upper limit voltage value VR2, which is greater than the lower limit voltage value VR1, based on the value of an output voltage V0 of the comparator 27a.

With such a configuration, the amount of current flowing out of the feedback signal input terminal $T_{FB}$ of the control circuit 12 is input to the error amplification circuit 31 as the feedback voltage signal VFB. Herein, when the error amplification circuit 31 receives the feedback voltage signal VFB, the error amplification circuit 31 outputs the error voltage signal VEAO, which changes linearly according to the amount of current flowing out of the feedback signal input terminal $T_{FB}$, whereby a reference detection voltage value VCL of the drain current detection circuit 22, which receives the error voltage signal VEAO, also changes linearly.

As described above, the output voltage VOUT of the switching power supply unit of the present embodiment is basically determined by the breakdown voltage of the Zener diode, which forms the output voltage detection circuit 14. Therefore, the output voltage VOUT can be set and changed easily, whereby it is possible to realize a level of ease of use as that of a linear regulator.

For a switching power supply unit that converts a DC voltage of about 100 V or more into a DC current of about 25 V or less, the present embodiment provides significant effects of reducing the cost and the size and increasing the functionality.

Note that the switching device 11 may be a bipolar transistor instead of a MOSFET.

The operation of the switching power supply unit as described above will now be described with reference to FIG. 1 and FIG. 2.

First, as illustrated in FIG. 1, when the input voltage VIN, which is a first DC voltage, is applied to the main input terminal 17, a control current is supplied by the voltage regulator 21 from the drain terminal $T_D$ to the control circuit power supply capacitor 16 connected to the reference voltage terminal $T_{BP}$, thereby increasing the voltage value at the reference voltage terminal $T_{BP}$. At this point, the voltage value at the main output terminal 19 is 0 V, and when the voltage value at the reference voltage terminal $T_{BP}$ reaches a predetermined start-up voltage value, the switching device 11 enters a switching state, i.e., a state where it is repeatedly turned ON and OFF (an oscillating state). At this stage, no current flows through the feedback signal input terminal $T_{FB}$, whereby the reference detection voltage value VCL of the drain current detection circuit 22 is constant.

When the switching device 11 is ON, a drain current IDS flows into the coil 13a of the voltage conversion circuit 13 from the main input terminal 17. Then, when the switching device 11 transitions from ON to OFF, a current is no longer supplied from the main input terminal 17 to the coil 13a, whereby the electric energy accumulated in the coil 13a is supplied to the main output terminal 19 via the regenerative diode 13b as the output voltage VOUT, which is the second DC voltage.

The regenerative diode 13b is required to have a withstand voltage as high as that of the switching device 11. Moreover, as the recovery speed of the regenerative diode 13b is higher, the voltage conversion efficiency thereof is higher. Therefore, it is preferred that the reverse recovery time or the reverse current time Trr is set to be about 50 ns.

The state where the output voltage VOUT is less than or equal to the predetermined output voltage value V0 (VOUT≦V0) is referred to as the "rated-load state". In the rated-load state, the current/voltage waveforms at the various locations of the power supply unit are as shown in FIG. 2 under the label "Rated load".

Next, the operation in a state where the output voltage VOUT is higher than the output voltage value V0 (VOUT>V0) will be described. This includes the following two states: (1) a load-transitioning state; and (2) a stand-by state. Note that if the stand-by state is assumed to be a no-load state, there exists a light-load state before the stand-by state is reached.

First, the load-transitioning state illustrated in FIG. 2 will be described.

If the output voltage VOUT at the main output terminal 19 increases to exceed the predetermined output voltage V0 while the switching device 11 is in the switching operation, the Zener diode of the output voltage detection circuit 14 breaks down. Herein, the predetermined output voltage V0 is the sum of the breakdown voltage Vz of the Zener diode and the forward voltage Vf of the light emitting section 15a of the feedback circuit When the output voltage detection circuit 14 breaks down, a detection current flows through the light emitting section 15a of the feedback circuit 15, whereby the light receiving section 15b of the feedback circuit 15 is turned ON. Thus, a feedback current flows from the feedback signal input terminal $T_{FB}$. The voltage value of the feedback voltage signal VFB of the output load detection circuit 30 is increased by the feedback current, whereby the voltage value of the error voltage signal VEAO from the error amplification circuit 31 decreases. The reference detection voltage value VCL of the drain current detection circuit 22 decreases in proportion to the error voltage signal VEAO. As a result, the peak current value of the drain current IDS flowing through the switching device 11 also decreases in proportion to the reference detection voltage value VCL.

Furthermore, as the error voltage signal VEAO decreases, and the reference voltage VR in the light load detection circuit 27 decreases to the lower limit voltage value VR1, i.e., the initial value, the unit enters the stand-by state.

Referring to FIG. 1, when the voltage value of the error voltage signal VEAO becomes lower than the lower limit voltage value VR1, the output voltage V0 of the comparator 27a of the light load detection circuit 27 transitions from the high level to the low level, whereby the output signal of the second AND circuit 28 is forcibly brought to the low level, and the reference voltage VR of the reference voltage source 27b is switched from the lower limit voltage value VR1 to the upper limit voltage value VR2, which is higher than the lower limit voltage value VR1.

When the output signal from the second AND circuit 28 is brought to the low level, the output signal from the RS flip flop circuit 26 and the first AND circuit 24 is brought to the low level, thereby turning OFF the switching device 11.

When the switching device 11 is turned OFF, the drain current IDS is no longer supplied from the main input terminal 17. Therefore, the voltage across the output capacitor 13c, i.e., the output voltage VOUT at the main output terminal 19, gradually decreases, as illustrated in FIG. 2. As the output voltage VOUT decreases, the detection signal from the light emitting section 15a of the photo coupler 15 gradually decreases, and the light receiving section 15b gradually approaches the OFF state, whereby the current flowing out of the feedback signal input terminal $T_{FB}$ also decreases gradually. As the current flowing out of the feedback signal input terminal $T_{FB}$ decreases, the voltage value of the feedback voltage signal VFB of the output load detection circuit 30 also decreases, whereby the voltage value of the error voltage signal VEAO output from the error amplification circuit 31 gradually increases.

When the error voltage signal VEAO becomes higher than the upper limit voltage value VR2 of the reference voltage source 27b, the high level output signal V0 is output from the comparator 27a, whereby the switching device 11 again starts the repeated ON/OFF operation according to the output signal from the oscillator 23. At this point, the reference voltage VR of the reference voltage source 27b is switched back from the upper limit voltage value VR2 to the lower limit voltage value VR1 by the high level output signal V0 from the comparator 27a.

Then, as the switching device 11 resumes the repeated ON/OFF operation, the output voltage VOUT again starts increasing, thereby increasing the amount of current flowing out of the feedback signal input terminal $T_{FB}$ by the feedback signal from the feedback circuit 15. Thus, the voltage value of the error voltage signal VEAO decreases, as described above, and when the voltage value of the error voltage signal VEAO decreases to the lower limit voltage value VR1, the switching device 11 is forcibly turned OFF.

Thus, the switching power supply unit of the present embodiment is controlled based on the load state of the output voltage VOUT at the main output terminal 19, with the predetermined output voltage V0 being the reference.

Moreover, the control circuit 12 is located on the high voltage side of the coil 13a of the voltage conversion circuit 13, and operates with the potential at the source terminal $T_S$ of the switching device 11, i.e., the high-voltage-side terminal of the coil 13a, being the reference potential. Moreover, the output voltage detection circuit 14 detects the voltage value of the output voltage VOUT irrespective of the operating state of the switching device 11.

As described above, the switching device 11 of the present embodiment has the following four operations that are selectively performed depending on the output load state of the unit:

(1) a rated-load operation, where the switching device 11 performs a repeated switching operation in which the peak current value of the drain current IDS is constant;

(2) a transitional-load operation, where the switching device 11 performs a repeated switching operation in which the peak current value of the drain current IDS changes according to the load state;

(3) a light-load operation, where the switching device 11 performs a repeated switching operation in which the peak current value of the drain current IDS is at the lowest level; and (4) a stand-by operation, where the switching device 11 is alternately in a switching state where it is subject to the ON/OFF control by the control circuit 12 and in a standing state where it is not subject to the ON/OFF control, i.e., an intermittent operation where the switching operation repeatedly stops and resumes.

Note that while the current/voltage waveforms are shown in FIG. 2 while assuming a non-continuous mode where there is no reflected power from the output side, the operation is performed according to the load state at the main output terminal 19 as described above also in a continuous mode where there is reflected power from the output side.

Note however that in the continuous mode, the current waveform of the drain current IDS is a trapezoidal current waveform, instead of a triangular current waveform as in the non-continuous mode. This is because while the switching device 11 is OFF, not all of the electric energy accumulated in the coil 13a of the voltage conversion circuit 13 is supplied to the output capacitor 13c, and the switching device 11 is turned ON with a portion of the electric energy left in the coil 13a.

Moreover, it is preferred that the elements included in the on-substrate formation region delimited by a broken line 20 in FIG. 1, i.e., the switching device 11 and the control circuit 12, are integrated onto a single semiconductor substrate to package them into a single chip. In such a case, it is preferred that the integration done so that at least the following four terminals serve as external connection terminals: the drain terminal $T_D$, which is one of the two main terminals of the switching device 11; the source terminal $T_S$, which is another one of the two main terminals of the switching device 11; the reference voltage terminal $T_{BP}$ for providing a connection to the control circuit power supply capacitor 16 for producing the power supply voltage for the control circuit 12; and the feedback signal input terminal $T_{FB}$ for providing a connection to the feedback circuit 15, which is controlled by the output voltage detection circuit 14.

When the elements are contained in a package so that the package includes the at least four external connection terminals, it is possible to significantly reduce the number of components, and the size of the component is also reduced, whereby it is possible to realize a switching power supply unit that is smaller and inexpensive.

Note that the on-substrate formation region 20 does not always have to be a single semiconductor substrate, but may be made by using a plurality of semiconductor substrates.

First Variation

The first variation of the embodiment of the present invention will now be described with reference to the drawings.

Figure 3:
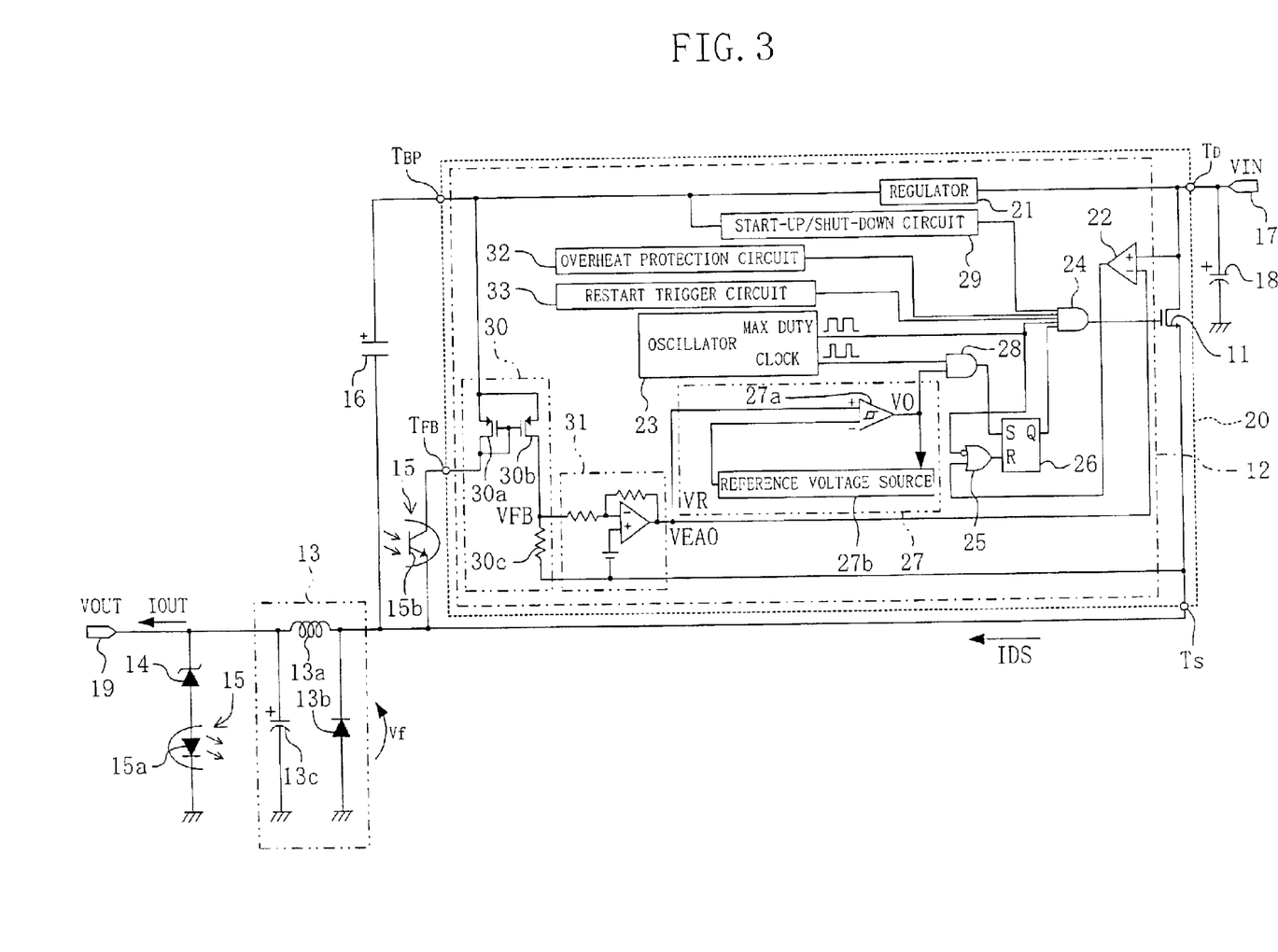
FIG. 3 is a schematic circuit diagram illustrating a step-down chopper-type switching power supply unit according to a first variation of the embodiment of the present invention.

FIG. 3 illustrates a schematic circuit configuration of a non-insulated step-down chopper-type switching power supply unit according to the first variation. In FIG. 3, those elements that are already shown in FIG. 1 are denoted by the same reference numerals and will not be further described below.

As illustrated in FIG. 3, the control circuit 12 of this variation includes an overheat protection circuit 32 and a restart trigger circuit 33 each sending an output signal to the first AND circuit 24 to control the operation of the switching device 11.

The overheat protection circuit 32 stops the switching operation of the switching device 11 by outputting a low level signal to the first AND circuit 24 when the temperature of the on-substrate formation region 20 increases to be equal to or greater than a predetermined temperature due to some abnormality in the switching device 11, etc.

At restart, a high level signal is once brought down to a low level by the restart trigger circuit 33 so as to reset the first AND circuit 24.

Second Variation

The second variation of the embodiment of the present invention will now be described with reference to the drawings.

Figure 4:
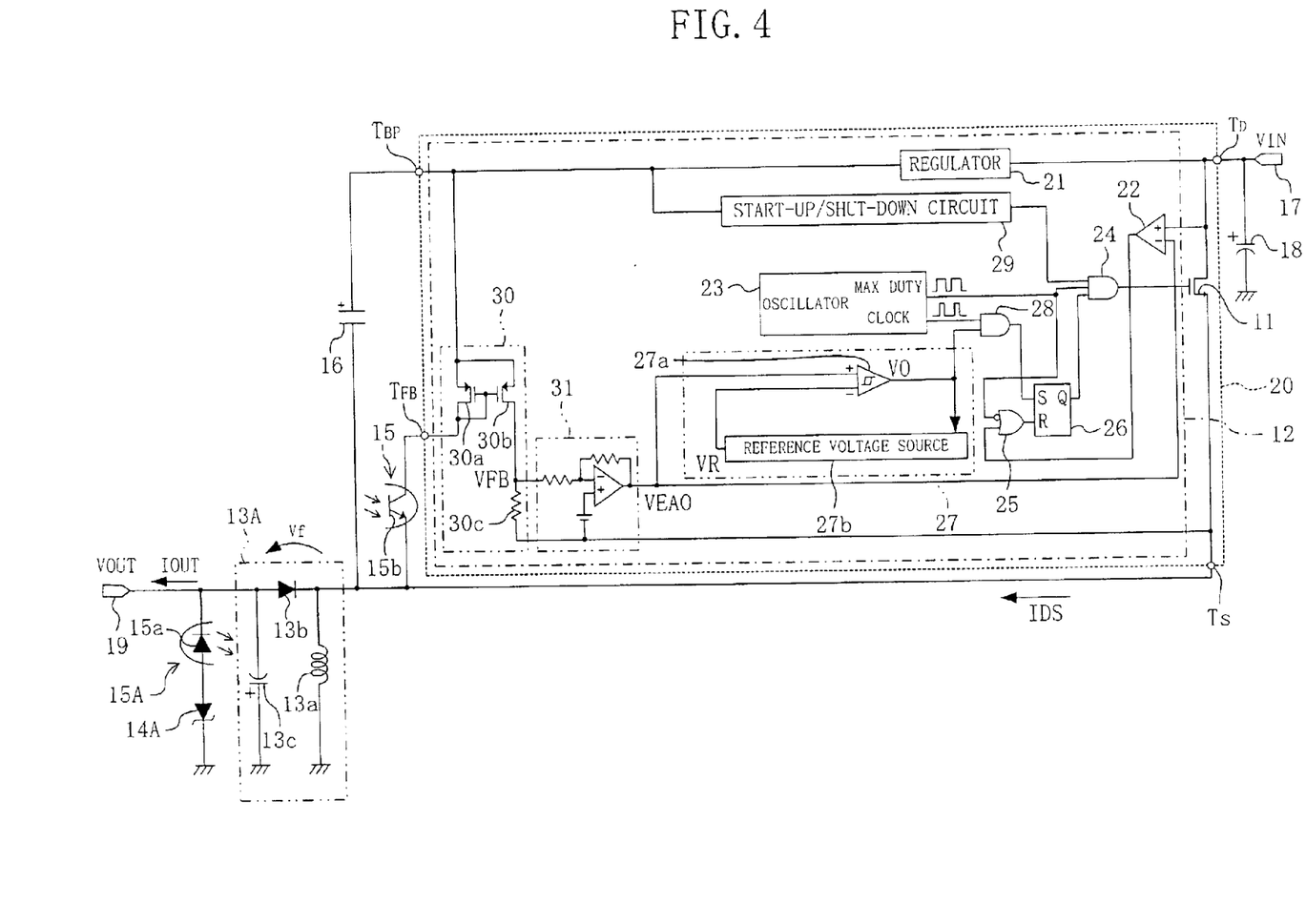
FIG. 4 is a schematic circuit diagram illustrating a step-down chopper-type switching power supply unit according to a second variation of the embodiment of the present invention.

FIG. 4 illustrates a schematic circuit configuration of a non-insulated step-down chopper-type switching power supply unit according to the second variation. In FIG. 4, those elements that are already shown in FIG. 1 are denoted by the same reference numerals and will not be further described below.

As illustrated in FIG. 4, in the switching power supply unit of this variation, the polarity of the output voltage VOUT, which is output to the main output terminal 19, is set to be negative. In this way, the switching power supply unit can be used with a device that requires a controlled voltage source of the negative polarity, without modifying the circuit configurations of the basic circuits such as the switching device 11 and the control circuit 12 from those in the case of a voltage source of the positive polarity.

Specifically, in a voltage conversion circuit 13A, one of the terminals of the coil 13a that is on the opposite side to the source terminal $T_S$ is grounded while the anode of the regenerative diode 13b is connected to the main output terminal 19.

Moreover, in an output voltage detection circuit 14A, which is a Zener diode, the cathode is grounded and the anode is connected to the anode of the light emitting section 15a of a feedback circuit 15A, which is a photo coupler. Moreover, the cathode of the light emitting section 15a is connected to the main output terminal 19.

Note that also in the second variation, the overheat protection circuit 32 and the restart trigger circuit 33 of the first variation may be provided.

Third Variation

The third variation of the embodiment of the present invention will now be described with reference to the drawings.

Figure 5:
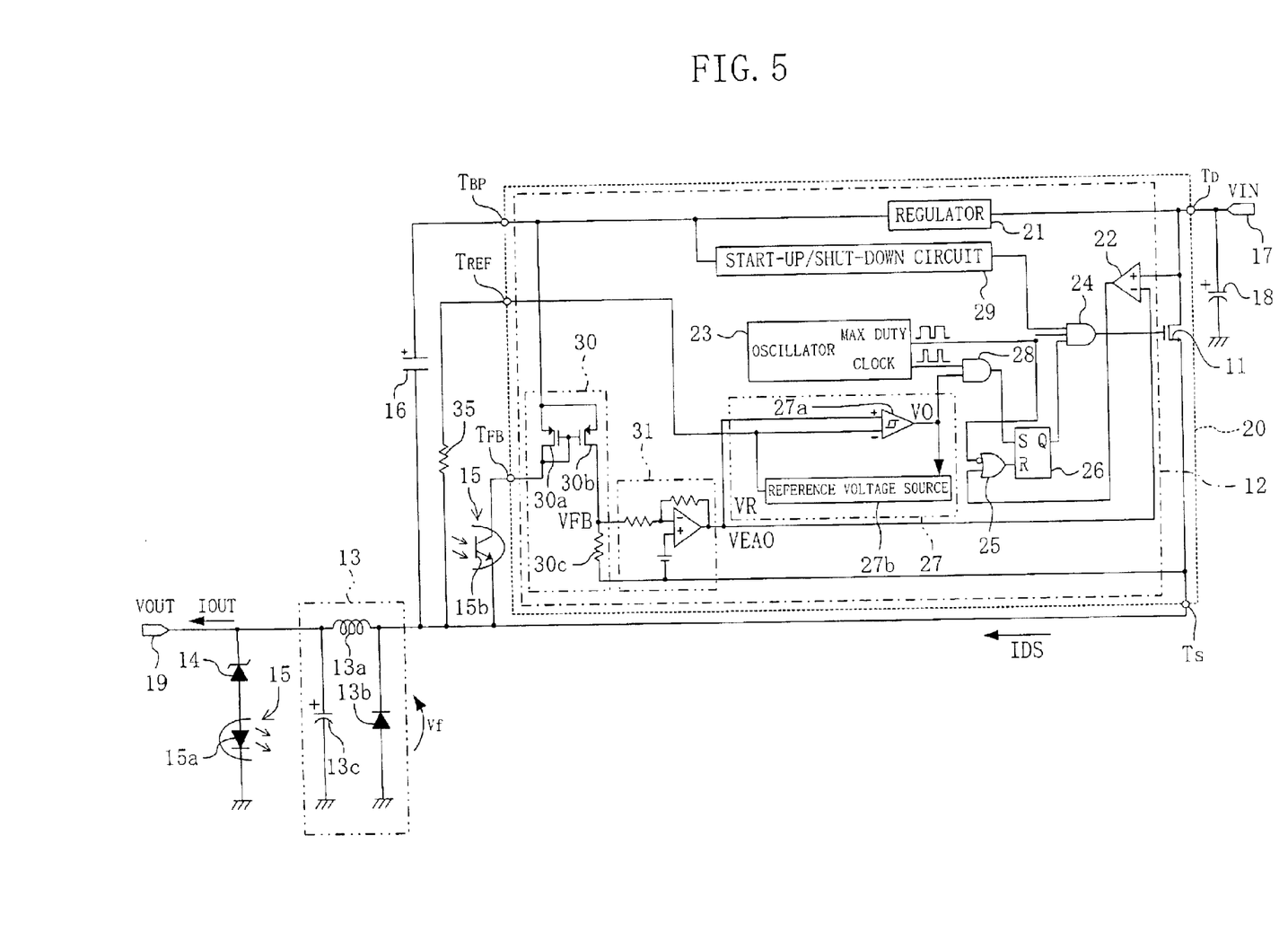
FIG. 5 is a schematic circuit diagram illustrating a step-down chopper-type switching power supply unit according to a third variation of the embodiment of the present invention.

FIG. 5 illustrates a schematic circuit configuration of a non-insulated step-down chopper-type switching power supply unit according to the third variation. In FIG. 5, those elements that are already shown in FIG. 1 are denoted by the same reference numerals and will not be further described below.

As illustrated in FIG. 5, the switching power supply unit of this variation includes, as detection voltage variable means, a resistor 35 for adjusting the light load detection voltage. One end of the resistor 35 is connected to the positive phase input terminal of the comparator 27a of the light load detection circuit 27 via a terminal $T_{REF}$ for adjusting the light load detection voltage. The terminal $T_{REF}$ is provided along an edge of the on-substrate formation region 20. The other end of the resistor 35 is connected to the source terminal $T_S$.

The resistor 35, with which it is possible to variably set the reference voltage VR of the reference voltage source 27b in the light load detection circuit 27, provides an effect as follows. By appropriately adjusting the resistance value of the resistor 35, the value of a load current IOUT when the switching operation of the switching device 11 is stopped/resumed can be adjusted optimally according to the load that is required during a stand-by operation. As a result, even in a case where the switching device 11 and the control circuit 12 are packaged into a single chip, the lower limit voltage value VR1 or the upper limit voltage value VR2 of the reference voltage VR in the light load detection circuit 27 can be changed according to the application of the power supply unit.

Note that while the resistor 35 is provided outside the on-substrate formation region 20 in this variation, it may alternatively be provided inside the on-substrate formation region 20.

In a case where the resistor 35 is provided inside the on-substrate formation region 20, the adjustment of the resistance value of the resistor 35 may be done by using a trimming technique such as a laser trimming method.

Note that also in the third variation, the overheat protection circuit 32 and the restart trigger circuit 33 of the first variation may be provided.

Moreover, the resistor 35 of this variation may be provided in the power supply unit of the negative polarity of the second variation as described above.

What is claimed is:

1. A switching power supply unit, comprising:
   a smoothing input capacitor for receiving a first DC voltage;
   a switching element for receiving the first DC voltage;
   a control circuit for controlling an operation of the switching element;
   a control circuit power supply capacitor provided between an output terminal of the switching element and a reference voltage terminal of the control circuit;
   a voltage conversion circuit for receiving an output signal from the switching element and converting the first DC voltage into a second DC voltage whose absolute voltage value is smaller than that of the first DC voltage;
   an output voltage detection circuit provided on an output side; and
   a feedback circuit for receiving a detection signal from the output voltage detection circuit and feeding back the received detection signal to the control circuit, the control circuit including:
      a regulator provided between an input terminal of the switching element and the reference voltage terminal for holding a voltage at the reference voltage terminal at a predetermined value;
      an output load detection circuit for receiving a feedback signal from the feedback circuit;
      an error amplifier for producing an error voltage signal that represents a difference between an output signal from the output load detection circuit and a reference voltage;
      an element current detection circuit for detecting a current flowing through the switching element with an output signal of the error amplifier being a reference; and
      a light load detection circuit for stopping a switching operation of the switching element when the error voltage signal is lower than a lower limit voltage while resuming the switching operation of the switching element when the error voltage signal is higher than an upper limit voltage, wherein:
         the light load detection circuit includes a reference voltage source for outputting the lower limit voltage and the upper limit voltage, and a comparator for comparing a voltage signal output from the reference voltage source with the error voltage signal; and the lower limit voltage and the upper limit voltage are switched from one to another based on an output signal of the comparator.

2. The switching power supply unit of claim 1, wherein the feedback circuit includes a photo coupler.

3. The switching power supply unit of claim 1, wherein the error voltage signal changes linearly according to a current flowing through the feedback circuit, so that a period of time for which the switching operation of the switching element is stopped changes linearly with respect to a change in a power at a main output terminal.

4. The switching power supply unit of claim 1, wherein the output voltage detection circuit includes a circuit including a Zener diode and a light emitting element connected in series with each other.

5. The switching power supply unit of claim 1, wherein the feedback circuit includes a switching element having a light receiving section.

6. The switching power supply unit of claim 1, wherein the output voltage detection circuit and the feedback circuit are a Zener diode and a photo coupler, respectively.

7. The switching power supply unit of claim 1, wherein a value of the first DC voltage is about 100 V or more, and a value of the second DC voltage is about 25 V or less.

8. The switching power supply unit of claim 1, wherein the control circuit includes overcurrent protection means for detecting an overcurrent to stop the switching operation of the switching element.

9. The switching power supply unit of claim 1, wherein the control circuit includes overcurrent protection means for detecting an overcurrent to stop the switching operation of the switching element, and overheat protection means for detecting an overheated state to stop the switching operation of the switching element.

10. A semiconductor device for a switching power supply, the switching power supply including: a smoothing input capacitor for receiving a first DC voltage; a switching element for receiving the first DC voltage; a control circuit for controlling an operation of the switching element; a control circuit power supply capacitor provided between an output terminal of the switching element and a reference voltage terminal of the control circuit; a voltage conversion circuit for receiving an output signal from the switching element and converting the first DC voltage into a second DC voltage whose absolute voltage value is smaller than that of the first DC voltage; an output voltage detection circuit provided on an output side; and a feedback circuit for receiving a detection signal from the output voltage detection circuit and feeding back the received detection signal to the control circuit, the semiconductor device comprising the switching element and the control circuit, the control circuit including:

a regulator provided between an input terminal of the switching element and the reference voltage terminal for holding a voltage at the reference voltage terminal at a predetermined value;

an output load detection circuit for receiving a feedback signal from the feedback circuit;

an error amplifier for producing an error voltage signal that represents a difference between an output signal from the output load detection circuit and a reference voltage;

an element current detection circuit for detecting a current flowing through the switching element with an output signal of the error amplifier being a reference; and a light load detection circuit for stopping a switching operation of the switching element when the error voltage signal is lower than a lower limit voltage while resuming the switching operation of the switching element when the error voltage signal is higher than an upper limit voltage, wherein:

the light load detection circuit includes a reference voltage source for outputting the lower limit voltage and the upper limit voltage, and a comparator for comparing a voltage signal output from the reference voltage source with the error voltage signal; and the lower limit voltage and the upper limit voltage are switched from one to another based on an output signal of the comparator.

11. The semiconductor device for a switching power supply of claim 10, further comprising detection voltage variable means capable of variably setting a value of the lower limit voltage or the upper limit voltage.

12. The semiconductor device for a switching power supply of claim 10, wherein the switching element and the control circuit are integrated on a single semiconductor substrate so that the input terminal and the output terminal of the switching element, and the reference voltage terminal and a feedback signal input terminal of the control circuit serve as external connection terminals.

13. The semiconductor device for a switching power supply of claim 10, wherein the switching element and the control circuit are contained in a single package so that the input terminal and the output terminal of the switching element, and the reference voltage terminal and a feedback signal input terminal of the control circuit serve as external connection terminals.

* * * * *